United States Patent [19]

Rogoff

[11] 4,090,856
[45] May 23, 1978

[54] PROCESS FOR ISOTOPE SEPARATION EMPLOYING CATAPHORESIS

[75] Inventor: Gerald L. Rogoff, Pittsburgh, Pa.

[73] Assignee: Westinghouse Electric Corp., Pittsburgh, Pa.

[21] Appl. No.: 599,210

[22] Filed: Jul. 25, 1975

[51] Int. Cl.² .............................................. B03C 1/00
[52] U.S. Cl. ......................................... 55/11; 55/135; 204/DIG. 11; 250/423 P
[58] Field of Search .......................... 55/2, 3, 9, 11, 17, 55/100, 101, 102, 135; 250/423 P; 204/DIG. 11

[56] References Cited

U.S. PATENT DOCUMENTS

| | | | |
|---|---|---|---|
| 3,154,682 | 10/1964 | Hartz et al. ............................... 55/102 |
| 3,277,631 | 10/1966 | Sunnen .................................... 55/100 |
| 3,443,087 | 5/1969 | Robieux et al. .......................... 55/102 |
| 3,511,776 | 5/1970 | Avampato ............................... 210/222 |
| 3,772,519 | 11/1973 | Levy et al. .................. 204/DIG. 11 |

Primary Examiner—Bernard Nozick
Attorney, Agent, or Firm—D. C. Abeles; Z. L. Dermer

[57] ABSTRACT

A method for separating isotopes in which a selected isotope is first ionized in a partially bounded region and then driven toward the boundary by space charge electric fields. Radial electric fields, which accelerate movement of the charged particles towards the walls of the boundary, are generated by charge separation associated with ambipolar diffusion of the particles in the plasma column. Selective photoexcitation leads to the preferential ionization of the isotopic component to be separated from the gas mixture. The resulting altered gas mixture component concentrations in the central region and periphery of the bounded area flow from the system through different output channels.

14 Claims, 7 Drawing Figures

PROCESS FOR ISOTOPE SEPARATION EMPLOYING CATAPHORESIS

BACKGROUND OF THE INVENTION

This invention relates generally to an isotopic separation process and, more particularly, to isotopic separation processes which employ radial cataphoresis.

The separation of the isotope $^{235}U$ (which is fissionable by neutrons) from natural uranium, a mixture containing mainly nonfissionable $^{238}U$, or simply enrichment of the mixture in $^{235}U$ are extremely important processes for nuclear applications. The most commonly used process presently being employed on an industrial scale is separation by diffusion through a porous barrier. A number of other processes (electromagnetic separation employing devices derived from the mass spectrometer, for instance the so-called "calutron", separation by centrifugation, by thermal diffusion . . .) have been used or suggested, but have not been employed for large scale operation.

A gaseous diffusion separation stage leads to a separation factor of approximately 1.004. Starting from natural uranium, for which the ratio $r = {}^{235}U/{}^{238}U$ is of the order of 0.7%, the obtaining of a product with an $r$ ratio equal to 3% will necessitate about 1,100 diffusion stages. Thus, any improvement in the efficiency of the enrichment process will effect considerable savings.

As previously mentioned, uranium isotope separation can be accomplished in several ways. Recently, selective photoexcitation which leads to the preferential ionization of a particular isotopic component of a gas mixture has been explored as one process for improving the efficiency of uranium enrichment. Generally, in optical isotope separation schemes there are essentially three principal steps. The first is the preferential absorption of the optical radiation to produce selective excitation or ionization of the atoms or molecules which contain the desired isotopic species. The second step is enhancement of the rates of chemical reactions or physical phenomena which involve the atoms, molecules, or ions containing the desired isotopic species as the result of their preferential absorption and excitation. The third step involves the separation of the resulting atoms, molecules, or ions as the result of the enhancement.

Various procedures for performing the first two steps for optical isotope separation have been explored, and an example can be found in the patent to J. Robieux et al, entitled "Isotopic Separation Process," U.S. Pat. No. 3,443,087, issued May 6, 1969 and the article "Proposed New Method For Separating Isotopes", by Stangeby and Allen, Nature, Vol. 233, p. 472, 1971. The third step introduces a serious problem when a process is scaled to a high throughput for a large-scale separation plant. There are several methods by which this third step can be accomplished employing either photochemical, electric field, or magnetic separation. Photochemical separation introduces additional chemical processing stages not generally required by the other methods. A high density collection of electrons and ions develops space charge in the course of the first two steps which shields an applied electric field. Therefore, the field does not easily penetrate the ionized gas to drive the ions toward an appropriate output channel. In time, of course, the field in a static volume of gas will penetrate as charged particles diffuse out of and are removed from the region of interest. However, for a high throughput commercial system, a quasi-neutral ionized cloud will continuously be present which will, in effect, function to shield the electric field. Alternatively, the ions can be deflected from the gas stream in a commercial system by an applied magnetic field instead of an electric field since, in general, a magnetic field will penetrate a plasma. However, to generate a magnetic field requires considerably more power than an electric field, which is easier to establish, and therefore will affect the overall efficiency of the process. Also, the magnitude of the required magnetic field can be a problem. Higher electric fields can easily be established, whereas higher magnetic fields are difficult to generate in reasonable volumes.

Accordingly, a new process is desired which will efficiently separate out a specific isotope selectively ionized in the course of an isotope separation process.

SUMMARY OF THE INVENTION

Briefly, this invention provides a method for separating out a specific isotope of interest from a gaseous mixture wherein the isotope of interest is first selectively ionized, which improves the overall efficiency of prior art isotope separation processes.

In accordance with the method of this invention, the gaseous mixture is contained within a partially bounded region. The isotope of interest is selectively ionized within the gaseous mixture creating an ion density sufficient to cause ambipolar diffusion of the ions towards the boundary confining the mixture. The gas adjacent the boundary, enriched in the isotope of interest which is substantially neutralized at the walls, is then separated from the remaining mixture.

In one embodiment, a buffer gas is introduced which is nonreactive with the other constituents of the mixture. The buffer gas serves to retard back diffusion of the isotope of interest after the ions are neutralized.

In addition, in another preferred embodiment, the electrons freed by the ionization process are heated to increase the rate of diffusion towards the boundary walls.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

While this invention principally deals with the third essential step of optical isotope separation and can be employed with a number of processes which achieve selective ionization of the isotope of interest, one such method of photoexcitation which is set forth in detail in the patent to Robieux et al, U.S. Pat. No. 3,443,087, will be described for achieving the first two steps leading to ionization, for a full appreciation of this invention. For the purposes of this invention, it should be appreciated that the term isotope is meant to include molecules as well as atoms.

In effect, according to quantum theory and to the study of molecular spectra, a molecule may be in several different energy states, corresponding either to different electronic orbits or to different internuclear distances or to rotations of some elements of the molecule with respect to other elements. The optical spectra emitted when the molecule falls from one energy state to another are called, respectively, according to the cause of this fall, electronic spectrum, vibrational spectrum, rotational spectrum, with compound spectra being possible.

In addition, it is known that there exists for every molecule a stable configuration corresponding to a minimum energy state. Almost all the molecules happen to be in this state, commonly called the ground state, with energy $W_0$. It is also known, that under these conditions, molecules may reach another energy level of value $W_1$ by absorption of radiation having a frequency given by the difference of energy between the two states, the energy variation W equal to $W_1 - W_0$ and the radiation frequency being related by Plank's equation: $W = h\nu$, where $\nu$ is the frequency and $h$ the quantum of action.

For one isotope of a given atom or molecule, this excitation will occur for a particular value of the frequency of the exciting radiation, and for a second isotope of the same atom or molecule the corresponding excitation will occur for a different value of the excitation frequency. This is the case in particular for a mixture of two isotopic compounds made, for instance, with $^{235}U$ and $^{238}U$.

According to the first step of the optical isotope separation process, the mixture of isotopic compounds is exposed to a narrow band radiation called in practice monochromatic, having the desired frequency for exciting the molecule of only one of the two compounds; the band being sufficiently narrow so as not to excite the other compound significantly.

The given isotopic mixture, in which the operation described above has generated excited states for the molecules of only one of the isotopic compounds, is subjected to a selective ionization process which forms the second step of the optical isotope separation process, according to a principle which will be described with reference to FIG. 1.

Figure 1:
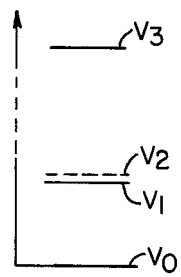
FIG. 1 is a graphic illustration of the relative energy levels of several isotopes within an exemplary gas mixture.

FIG. 1 shows a scale of the energy levels of the molecules (for instance in electron volts). Level $V = 0$ or $V_0$ corresponds to the ground state, which is the same for both types of molecules. Level $V_3$ is the ionized level, that is, the amount of energy required to free an electron and thus create an ion. For example, level $V_1$ is the excited level of $^{235}U$ and level $V_2$ is the excited level of $^{238}U$. If the misture is exposed to radiation with an energy corresponding to the transition between $V_0$ and $V_1$, $^{235}U$ will be excited and will reach level $V_1$, but $^{238}U$ will not become excited and will remain at level $V_0$. If radiation of a conveniently selected energy is applied to the mixture in its present state, the excited molecules of energy level $V_1$ will be further excited to level $V_3$ and become ionized, while the molecules still at level $V_0$ will not reach level $V_3$ and will not become ionized. The energy of the second radiation must therefore be higher than $V_3 - V_1$, but lower than $V_3 - V_0$, as otherwise the nonexcited molecules will become ionized. While to excite the respective molecules to their $V_1$ and $V_2$ states from the ground state the incident radiation must correspond to the energy necessary for this transition, any incident radiation corresponding to an energy level greater than the ionization level $V_3$ will result in ionization of the molecule. Thus, so long as the incident radiation does not contain the energy required for the $^{238}U$ molecule to make a transition from its ground state to the excited state $V_2$ or ionization state $V_3$ only the $^{235}U$ isotope will be ionized.

In the Robieux et al reference, a laser is used to excite the $^{235}U$ isotope to the first excited level and an ultraviolet source is used to selectively ionize the isotope within the mixture. While a uranium mixture is being employed in this example because of its importance in the production of nuclear fuel, it should be appreciated that the process of this invention has wide applicability to numerous atoms and molecules.

Figure 2:
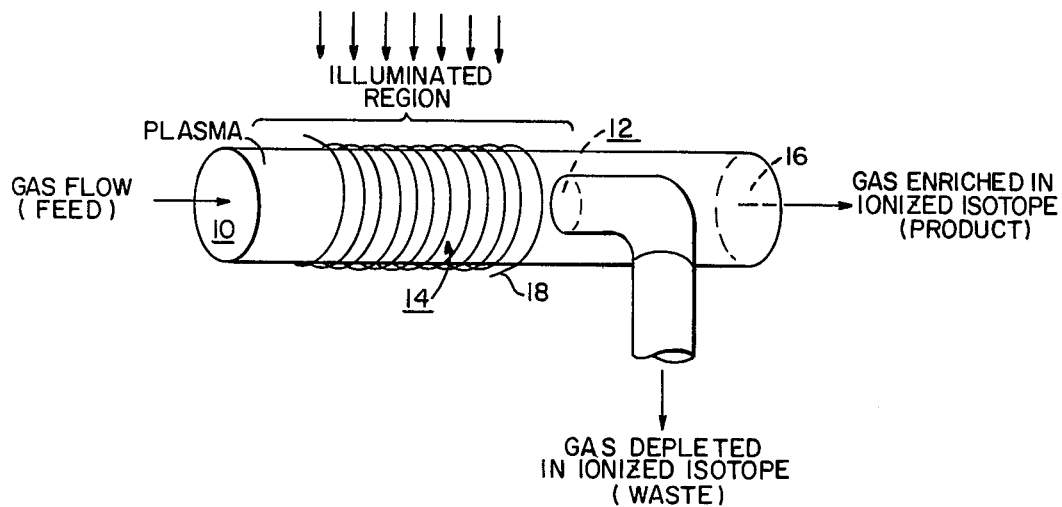
FIG. 2 is a schematic illustration of exemplary apparatus which can be employed to effect the isotope separation process of this invention.

FIG. 2 illustrates a partially bounded container in which the steps of the method of this invention can be practiced. The gas mixture including the isotope of interest is introduced at the inlet 10 and flows through the tubular chamber 14 where it is irradiated along the section identified as the illuminated region in accordance with the steps previously described for accomplishing the first two steps of the optical isotope separation process. The process of this invention utilizes the plasma developed by the selective ionization and establishes a density gradient sufficient to cause ambipolar diffusion to the walls of the tubular chamber where wall recombination rather than volume recombination occurs to neutralize the ions. In this case, the positive ions of $^{235}U$ and electron leave the ionization region in the same direction and at the same rate. This equalization of the loss rates of both ions and electrons is brought about by the space charge electric fields which establish a coupling attraction being the electrons and ions. The highly mobile electrons tend to diffuse outwardly more rapidly than the heavy ions, however the space charge attraction between the electrons and ions when ambipolar diffusion is established accelerates the ion movement. In accordance with this invention ambipolar diffusion is achieved by establishing ion densities greater than approximately $10^8$ ions per cubic centimeter within the central region of the tubular chamber 14. The density of the charged particles within the plasma are dependent upon the intensity of the illuminating radiation. While, as illustrated in the drawing, the region can be illuminated from the side of the vessel 14, preferably, illumination is achieved parallel with the axis of the tubular chamber with a narrow beam of radiation around the axis having a smaller diameter than the vessel 14 similar to the plot illustrated in FIG. 3, to accentuate the density gradient between the axis and the side walls of the gas container. In any event, whether illumination is provided parallel to or perpendicular to the axis of the tubular vessel 14, a density gradient will occur due to recombination of the ions and electrons at the vessel walls.

The space charge electric fields established within the vessel 14 retard the electrons in their outward movement from the central region of the vessel, and at the same time, drive the positive ions toward the walls considerably faster than they would diffuse simply due to their own density gradients. This enhanced ion diffusion process amounts to an outward pumping of ions, which is sometimes referred to as cataphoresis. A significant feature of this cataphoresis process is that it actually requires relatively large particle concentrations of approximately $10^8$ ions per cubic centimeter or greater for its operation.

In the embodiment illustrated in FIG. 2, radial cataphoresis continually pumps the ions to the peripheral walls of the vessel, enriching the concentration of the selected isotope within this region. At the same time, the gas passing through the central region of the vessel is depleted of the selected isotope. The depleted gas mixture is exhausted from the chamber through exit port 12 while the enriched gas mixture drawn from the periphery of the vessel is conveyed through exit port 16. Where greater $^{235}U$ concentrations are desired, the process can be repeated until the desired concentrations are obtained.

Figure 3:
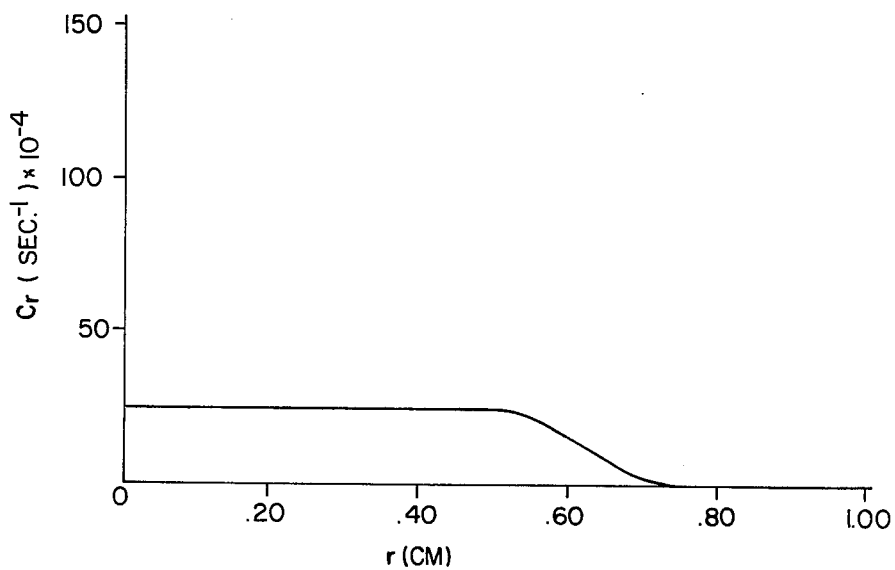
FIG. 3 is a graphical illustration showing the ionization coefficient of the isotope of interest as a result of selective photoexcitation, plotted as a function of the radius within the container.

FIG. 3 is a graphical representation of the ionization coefficient of the mixture irradiated in accordance with the steps of the method of this invention, plotted as a function of the radius within the vessel 14. The ionization coefficient is dependent to a degree on the intensity of the incident radiation and establishes the desired concentration of ions prescribed by the method of this invention to attain radial cataphoresis.

Figure 4:
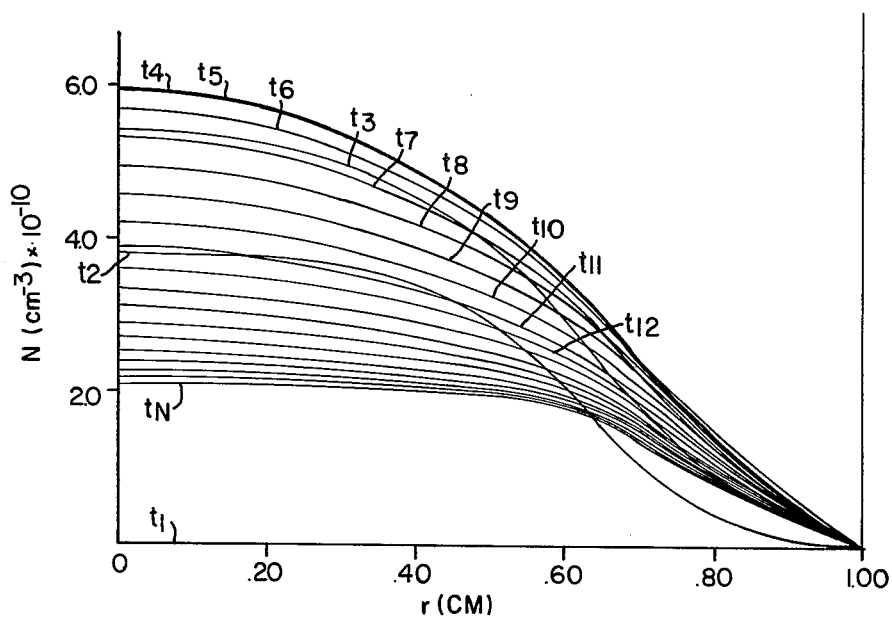
FIG. 4 is a representative plot of $^{235}U$ ion concentration obtained in the course of the method of this invention plotted as the function of the radius within the container.

FIG. 4 provides a representative graphical illustration of the $^{235}U$ ion concentration as a function of the radius within the vessel and shows the gradients that can be achieved. Approximately zero concentration is shown at the periphery of the radius due to wall recombination of the electrons and ions.

Figure 5:
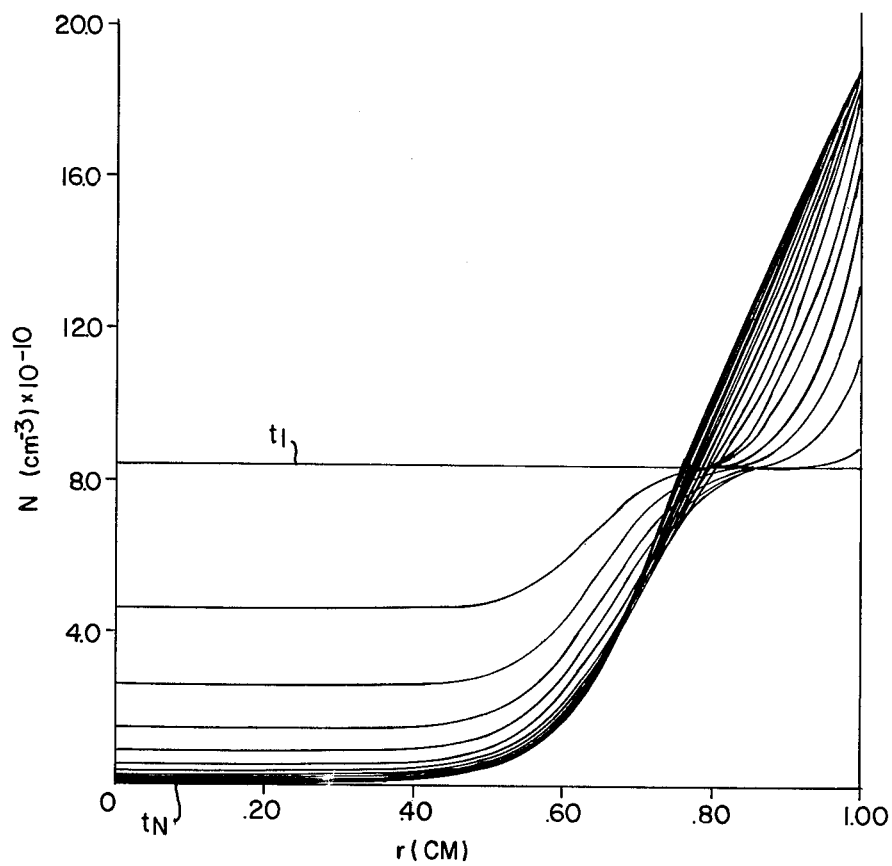
FIG. 5 is a graphical illustration of the representative $^{235}U$ neutral atom concentration plotted as a function of the radius of the gas within the container.

FIG. 5 shows a representative illustration of the $^{235}U$ neutral density as a function of the radius within the vessel. From this latter graphical showing it can be appreciated that a significant portion of the $^{235}U$ neutrals are ionized within the central region of the tube and that high neutral $^{235}U$ concentrations are established beyond 70% of the radial distance to the walls. Thus, desirably, the exhaust port 12 is sized in diameter to about 70% of the radius of the tubular vessel 14 to drain the significant portion of the depleted mixture.

Figure 6:
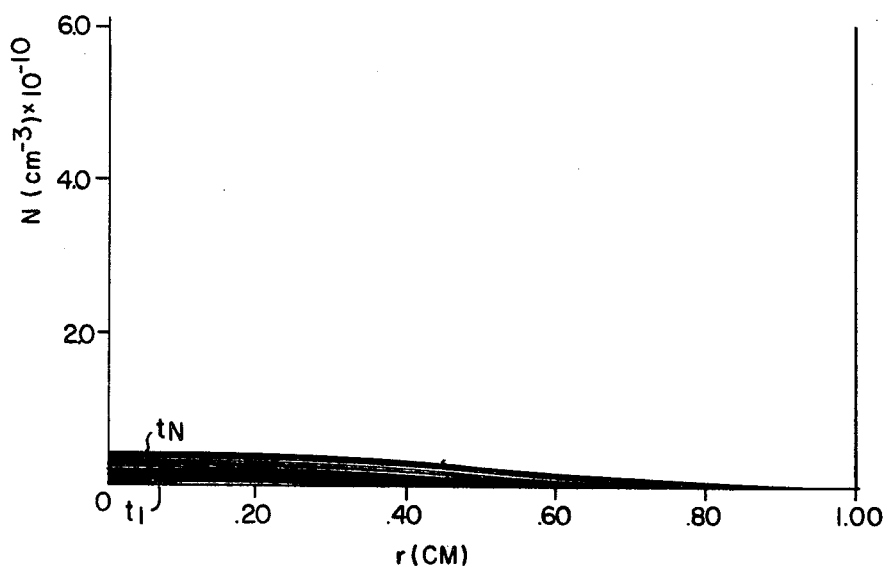
FIG. 6 is a graphical illustration of the ion concentration of $^{238}U$ plotted as a function of the radius of the gas within the container.
Figure 7:
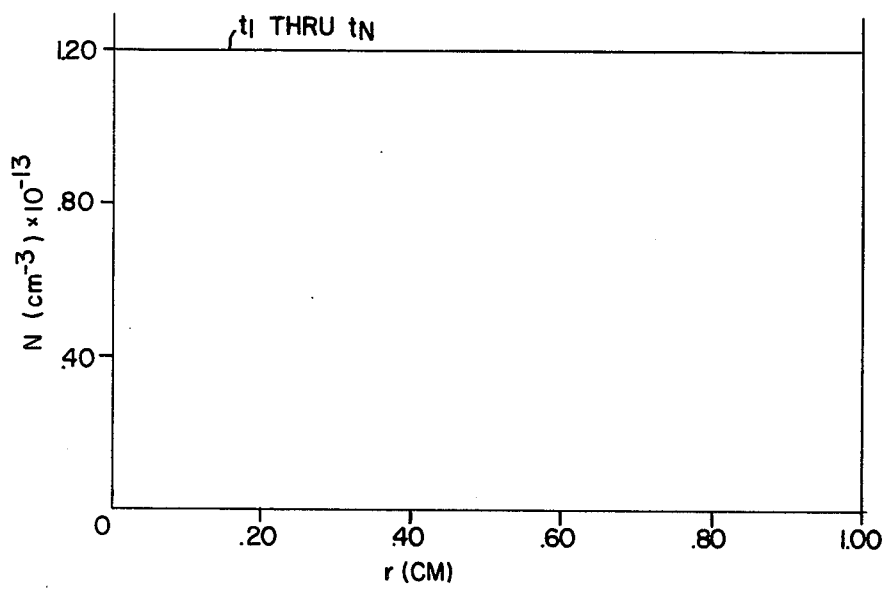
FIG. 7 is a graphical illustration representative of the $^{238}U$ concentration plotted as the function of the radius of the gas within the container.

FIG. 6 illustrates the $^{238}U$ ion concentration as a function of the radius within the chamber and shows that through selective ionization an insignificant amount of $^{238}U$ ions are formed, i.e., by charge transfer. For all practical purposes, the $^{238}U$ concentration of neutrals over the radius of the vessel is substantially constant as illustrated in FIG. 7.

The plots in FIGS. 4 through 7 were calculated over a $50.0 \times 10^{-6}$ sec. interval, from $t_1$ to $t_n$, with a $2.5 \times 10^{-6}$ sec. interval between plots with established concentrations as described in the example set forth hereinafter.

Detrimental exchange mechanisms must also be considered in implementing the cataphoresis process of this invention. These detrimental effects include energy exchange, charge exchange, and, where molecular constituents are utilized, neutral-neutral exchange. Energy exchange is a transfer of energy from one atom or molecule to another atom or molecule in the mixture as a result of collision. Charge exchange occurs when one ion in a mixture is neutralized by the transfer of charge to a neutral, which is thus ionized, as a result of a collision. Neutral-neutral exchange is where the composition of a molecule is altered by collision with another molecule or atom. These transfer processes can be avoided to some extent by utilizing a uranium molecular compound instead of atomic uranium. One isotopic form can then be selectively dissociated, with the subsequent selective excitation and ionization of a dissociation product. In this case, the ions would be of different molecular form than the other species in the mixture and resonant interactions can be avoided.

Energy exchange and neutral-neutral exchange can certainly be important in the selective ionization stage. However, the only exchange mechanism of concern for the physical separation process of this invention is charge transfer. The selectively ionized isotopic series must retain its charge until it has been moved radially sufficiently far to be in the output channel 16 for enriched material. The importance of charge transfer has been established by considering the pessimistic case of atomic uranium ions in atomic uranium vapor. This resonant situation probably represents a "worst case". From the references to F. R. Kovar, "Phys. Rev., 133:A681(1964)", R. Johnsen and M. A. Biondi, "J. Chem. Phys., 57:5292(1972)" and S. C. Brown, *Introduction To Electrical Discharges and Gases,* page 51, Wiley, New York, 1966, the upper limit on ion density can be established to avoid charge transfer. For example, in a buffer gas of approximately 1 Torr argon with a 1 centimeter tube radius, the upper limit on ion density would be approximately $1.2 \times 10^{13}$ ions per cubic centimeter. This is a substantial upper limit on the uranium density for which charge transfer is not a serious problem enabling recombination of the ions with the free electrons to occur at the chamber walls rather than having charge transfer, and thus neutralization of $^{235}U$ ions, occur in transit to the walls.

Note, that if an ion containing $^{235}U$ transfers its charge to a particle containing $^{238}U$ before reaching the proper output channel, the ionization energy is wasted, but the effect of radially pumped $^{238}U$ on the relative isotopic abundance is negligible as can be appreciated from the graphs previously described. As an alternative to working on $^{235}U$ (compounds), it is also possible to selectively ionize and pump $^{238}U$. This has the disadvantages, however, of requiring considerably more energy input for a given enrichment of $^{235}U$ near the center of the plasma, and of making charge transfer to the $^{235}U$ significantly more deleterious than the transfer to $^{238}U$ when $^{235}U$ is selectively ionized.

Because of the charge attraction between electrons and ions in ambipolar diffusion and the force exerted by the electrons in accelerating the ions, the ions are driven towards the walls faster than the neutrals at the walls can diffuse back towards the axis of the vessel 14 after recombination. This effect can be enhanced by introducing a nonreactive buffer gas, for example an inert gas such as argon, in proper proportions which will further inhibit the backflow of neutrals from the walls to the axis of the vessel. Collisions of the neutrals with the argon buffer will inhibit this back diffusion. The mixture itself should not be used for this purpose, i.e., by increasing the concentration of constituents, because of the charge transfer that would occur. While collisions will occur during radial cataphoresis during transit of the ions to the vessel walls, the charge attraction imposed by the electrons will reduce this effect. The result is a significant depletion of the selected isotope in the central region in the order of 10-100 times reduction in neutral density in some cases. Desirably the buffer gas density is low enough for the ion diffusion rate to exceed rates of charge transfer and volume recombination of ions and electrons. The density is provided high enough, however, to retard diffusion of neutralized isotopes back toward the center of the vessel. Analytical calculation and experimental results have shown that buffer gas densities corresponding to reduced pressures between 0.1 and 100 Torr will provide the desired results.

Desirably, to accelerate the rate of diffusion an electric field is established within the plasma by passing a current through the circumferentially wound electric coil 18. The electric field imparts energy which heats the electrons within the plasma to a higher temperature than that of the ions, due to the difference in electron and ion mass. The increased energy imparted to the electrons accelerates their movement, and through the space charge attraction between the electrons and ions, accelerates the movement of the ions towards the walls of the chamber. The degree of enhancement is approximately proportional to the ratio of the electron temperature to the ion temperature. This enhancement can be increased by operating the system at as low a temperature as possible, with limitations established by the temperature and pressure required to maintain the mixture in its vapor state. Thus, the initial temperature of the gas mixture is dependent upon the pressure and density of the gas must be at least that required to maintain the mixture in its vapor state. If heat were imparted directly to the gas mixture, the energies of the ions and neutrals would also increase to the same degree as that of the electrons, which reduces the enhancement of cataphoresis which is dependent on the ratio of the electron to ion temperature and would broaden the absorption lines of the constituents of the mixture increasing the probability that the wrong isotope will be ionized. Thus, direct heating of the gaseous mixture is avoided, however other methods of increasing the ratio of electron to ion temperature can be employed.

For a better appreciation of one preferred embodiment of this invention, the following example is presented to illustrate the steps of the method of this invention applied to the enrichment of uranium. While a number of ionization processes can be employed, for the purpose of this example, consider that the first two steps of optical isotope separation are accomplished in accordance with the method described in detail in the Robieux et al patent cited above. For the purposes of this example a vessel 14 with a radius of 1 centimeter is employed. The mixture to be separated includes a buffer gas of argon with a density corresponding to 1 Torr at 300° K. The initial neutral concentration of $^{238}U$ for this example is $1.2 \times 10^{-13}$ atoms/cm$^3$ and the $^{235}U$ initial neutral concentration is $8.4 \times 10^{-10}$ atoms/cm$^3$ giving a ratio of the natural abundance of $^{235}U$ of 0.007. The ion and gas temperature of this mixture is 0.2 eV and the electron temperature is 1.8 eV assuming these temperatures can be achieved without significant ionization of $^{238}U$ as a result of electron collisions. The first step in the Robieux et al process is carried out with a continuous laser, 10 watts, 5915.4 Å. The absorption cross-section is approximately $10^{-14}$ cm$^2$ with the shape of the exciting beam over the radius of the vessel substantially as indicated by FIG. 3. For the purposes of this example it is assumed that substantially all the excited atoms obtained in the first step of the Robieux et al process are immediately ionized by the second step. The result of ambipolar diffusion for the above conditions are then given by the graphs in FIGS. 3-7, which were obtained from calculations using the above value. The gas flow rate is limited only by the distance between the inlet and outlet and the time required for the first two steps and sufficient ambipolar diffusion of the ions to the vessel wall.

Axial cataphoresis which does not employ ambipolar diffusion has been effectively used for the purification of gases as described by J. Freudenthal, "J. Appl. Phys. 38, 4818 (1967)." The effect of radial cataphoresis employing ambipolar diffusion as described by the steps of this invention is easily shown to be dramatic in, for example, rare gases with admixtures of easily ionizable metal vapors. The density of the additive at the axis can easily be reduced in an order of magnitude or more from its initial value. Thus, the method described can be used either for a reduction in density of a particular isotope (near the axis) or for enhancement (near the walls).

In addition, while the preferred example has been illustrated as applied to uranium, it can be appreciated that the steps of the method of this invention can be used to separate other atoms or molecules containing the desired isotopic species.

I claim:

1. A method for separating a gas enriched in a preselected isotope out of a gaseous mixture including the preselected isotope comprising the steps of:

at least partially confining the gaseous mixture within a bounded container;

selectively ionizing the preselected isotope within the gaseous mixture to create a plasma with substantially no ionization of the remaining gaseous mixture other than the preselected isotope;

establishing an ion density of the preselected isotope within the plasma within the central region of the container sufficient to cause ambipolar diffusion of the ions of the preselected isotope to the boundary of the container;

separating the gas enriched in the preselected isotope substantially adjacent to the boundary of the container from the gas within the central region of the container; and removing from the container, respectively, the gas depleted of the ionized isotope from the central region of the container and the gas enriched in the ionized isotope adjacent the boundary of the container.

2. The method of claim 1 wherein the ionizing step creates ion densities of the preselected isotope greater than approximately $10^8$ ions/cu. cm.

3. The method of claim 1 wherein the container comprises a vessel having an inlet and an outlet spaced from the inlet including the steps of:

introducing the gaseous mixture at the inlet into the vessel; and exhausting from the vessel at least a portion of the separated gas at the outlet.

4. The method of claim 1 including the step of heating the electrons freed during the ionizing step.

5. The method of claim 4 wherein the heating step heats the freed electrons to a higher temperature than the ions of the preselected isotope.

6. The method of claim 5 wherein the heating step includes subjecting the gaseous mixture to an electric field.

7. The method of claim 6 wherein the electric field is established by circulating a time varying electric current through a wire wound around the boundary of the container.

8. The method of claim 1 including the step of introducing within the gaseous mixture a buffer gas which does not react chemically with the constituents of the mixture.

9. The method of claim 8 wherein the buffer gas comprises an inert gas.

10. The method of claim 8 wherein the density of the buffer gas corresponds to pressures between 0.1 and 100 Torr at 300° K.

11. The method of claim 1, wherein the container is formed from a tubular vessel wherein the ionizing step creates an ion density sufficient to cause ambipolar diffusion of the ions radially to the walls of the vessel.

12. The method of claim 11, wherein the vessel has a first and second axially spaced location, and wherein the gaseous mixture is introduced at the first location and a concentric tubular outlet is formed within the vessel at the second location, the outlet having a substantially smaller diameter than the vessel for exhausting the separated gas within the central region of the container.

13. The method of claim 11 including the step of exhausting the separated gas over approximately 70 to 80 percent of the radius of the vessel measured from the vessel's axis of rotation.

14. The method of claim 11 including the step of exhausting the separated gas over approximately 20 to 30 percent of the radius of the vessel measured from the vessel walls.

* * * * *